(12) United States Patent
Vitito

(10) Patent No.: US 9,393,915 B2
(45) Date of Patent: Jul. 19, 2016

(54) VEHICLE ENTERTAINMENT SYSTEM

(71) Applicant: VOXX INTERNATIONAL CORPORATION, Hauppauge, NY (US)

(72) Inventor: Christopher J. Vitito, Celebration, FL (US)

(73) Assignee: VOXX INTERNATIONAL CORPORATION, Hauppauge, NY (US)

(*) Notice: Subject to any disclaimer, the term of this patent is extended or adjusted under 35 U.S.C. 154(b) by 0 days.

(21) Appl. No.: 14/330,532

(22) Filed: Jul. 14, 2014

(65) Prior Publication Data

US 2014/0327836 A1 Nov. 6, 2014

Related U.S. Application Data

(63) Continuation of application No. 12/103,428, filed on Apr. 15, 2008, now Pat. No. 8,780,282, which is a continuation-in-part of application No. 11/177,405, filed on Jul. 11, 2005, now Pat. No. 7,604,273, which is a continuation-in-part of application No. 10/982,896, filed on Nov. 8, 2004, now abandoned.

(60) Provisional application No. 60/690,874, filed on Jun. 16, 2005, provisional application No. 60/517,862, filed on Nov. 7, 2003.

(51) Int. Cl.
| *B60R 11/02* | (2006.01) |
| *B60K 35/00* | (2006.01) |
| *B60K 37/06* | (2006.01) |
| *H04N 5/645* | (2006.01) |
| *B60R 11/00* | (2006.01) |

(52) U.S. Cl.
CPC .............. *B60R 11/0229* (2013.01); *B60K 35/00* (2013.01); *B60K 37/06* (2013.01); *B60R 11/0211* (2013.01); *B60R 11/0235* (2013.01); *H04N 5/645* (2013.01); *B60K 2350/1024* (2013.01); *B60K 2350/1028* (2013.01); *B60R 2011/0015* (2013.01); *B60R 2011/0017* (2013.01); *B60R 2011/0073* (2013.01); *B60R 2011/0075* (2013.01); *B60R 2011/0078* (2013.01); *B60R 2011/0082* (2013.01); *B60R 2011/0276* (2013.01)

(58) Field of Classification Search
CPC .............. B60R 2011/0017; B60R 2011/0015; B60R 2011/0075; B60R 2011/0082; B60R 11/02; B60R 11/0235
USPC .................................................. 348/836–839
See application file for complete search history.

(56) References Cited

U.S. PATENT DOCUMENTS

| 4,681,366 A | * | 7/1987 | Lobanoff | ............. | B60N 2/4876 248/475.1 |
| 6,698,832 B2 | * | 3/2004 | Boudinot | ............. | B60N 2/4876 297/217.4 |
| D521,964 S | | 5/2006 | Zhang | | |

(Continued)

OTHER PUBLICATIONS

US OA dated Nov. 5, 2014 for U.S. Appl. No. 11/215,084.

*Primary Examiner* — Ryan Kwiecinski
(74) *Attorney, Agent, or Firm* — F. Chau & Associates, LLC

(57) ABSTRACT

A vehicle entertainment system including a video system having a video monitor and a cradle secured within a vehicle. The cradle is shaped and dimensioned for selectively receiving and securely holding the video system. The cradle includes a docking port with a faceplate that is substantially flush with an upper end of a seat back of an automobile.

17 Claims, 16 Drawing Sheets

(56) References Cited

U.S. PATENT DOCUMENTS

| | | | |
|---|---|---|---|
| 7,758,116 B2* | 7/2010 | Hattori | B60N 2/4808 297/217.3 |
| 8,162,395 B2* | 4/2012 | Vitito | B60K 35/00 297/217.3 |
| 8,243,215 B2* | 8/2012 | Schedivy | 348/838 |
| 2008/0165293 A1* | 7/2008 | Tranchina | B60R 11/0235 348/837 |
| 2009/0174238 A1* | 7/2009 | Kuno | B60N 2/4876 297/217.3 |
| 2009/0261638 A1* | 10/2009 | Kuno | A47C 7/38 297/217.3 |
| 2009/0315368 A1* | 12/2009 | Mitchell | B60R 11/0235 297/188.04 |
| 2010/0244505 A1* | 9/2010 | Demick | B60N 2/4876 297/188.04 |
| 2011/0155873 A1* | 6/2011 | Montag | B60R 11/02 248/218.4 |
| 2012/0125959 A1* | 5/2012 | Kucera | B60R 11/0235 224/275 |

* cited by examiner

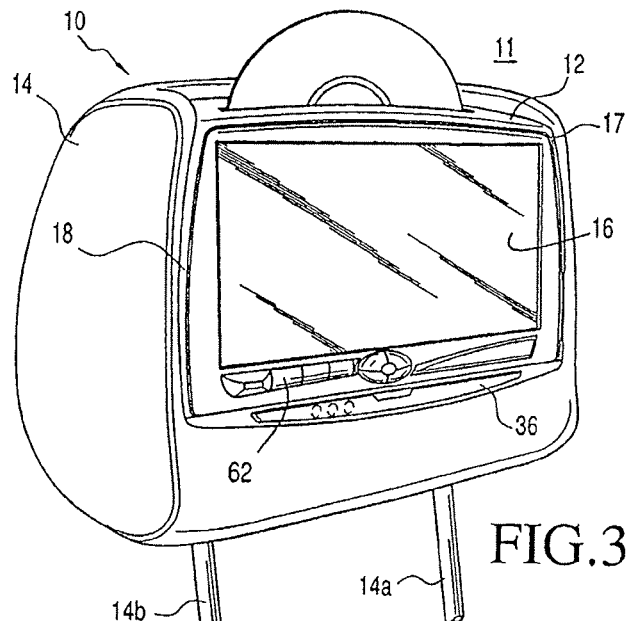
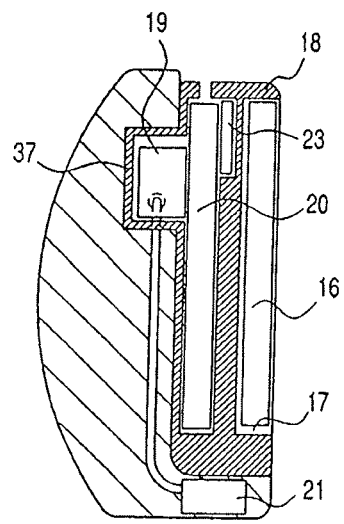
FIG.3  FIG.2
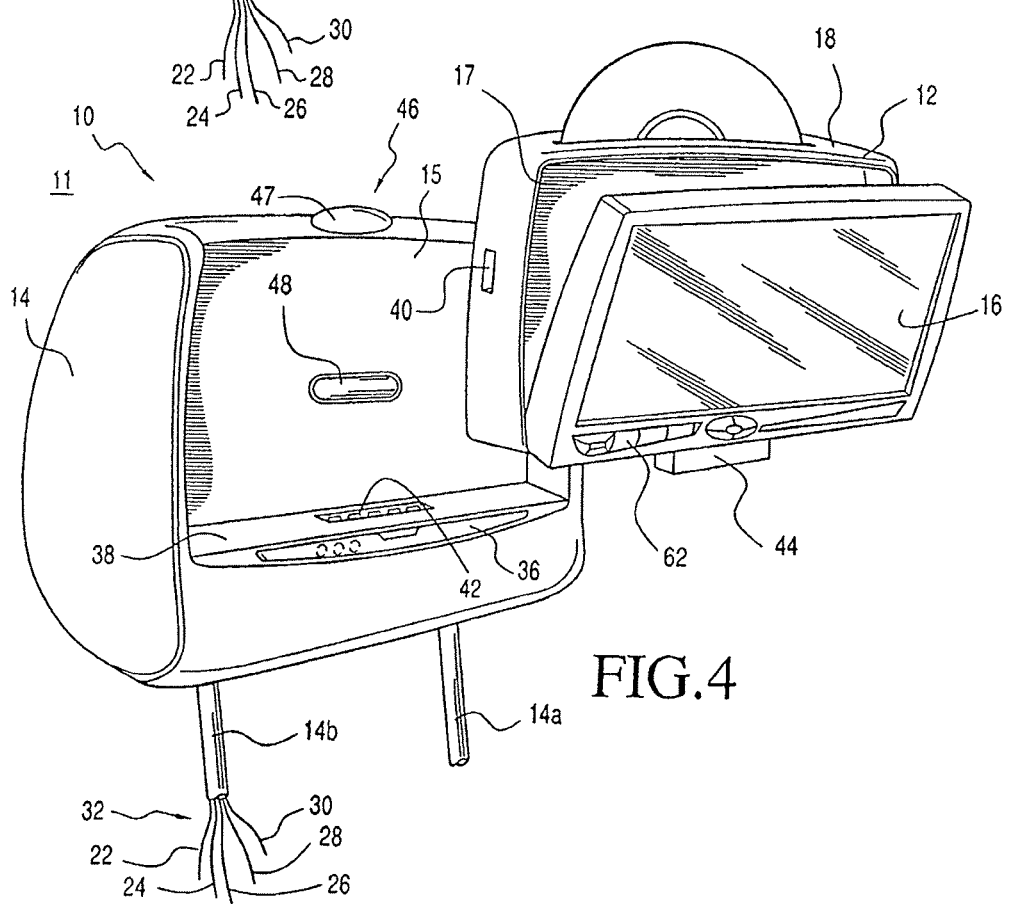
FIG.4

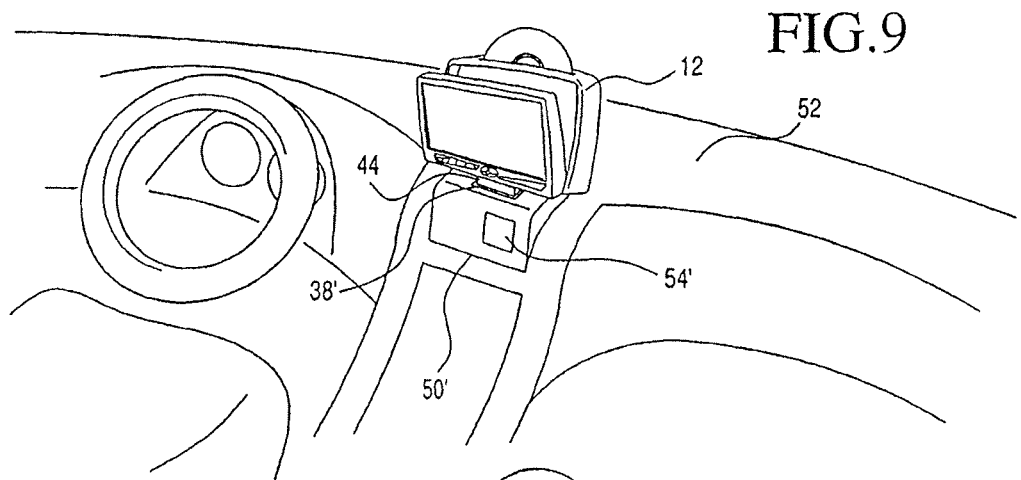
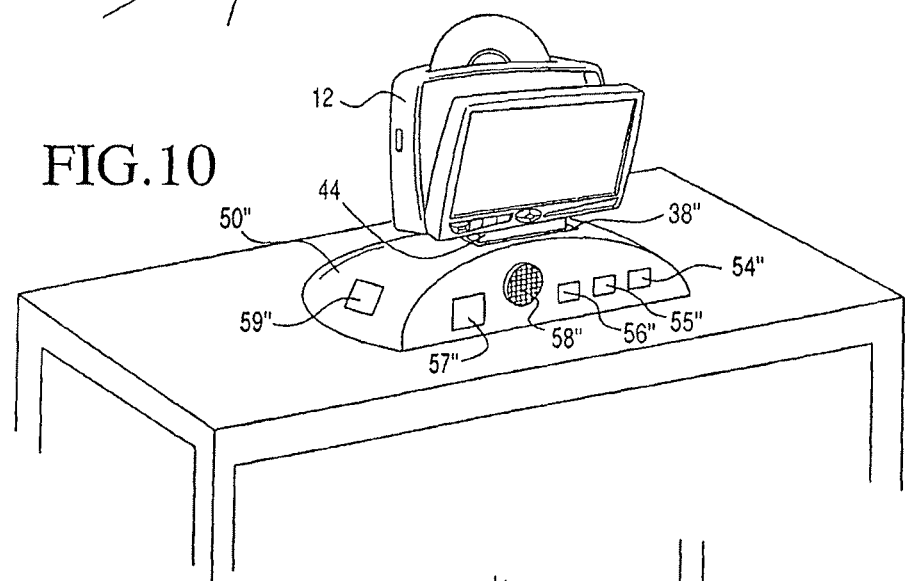
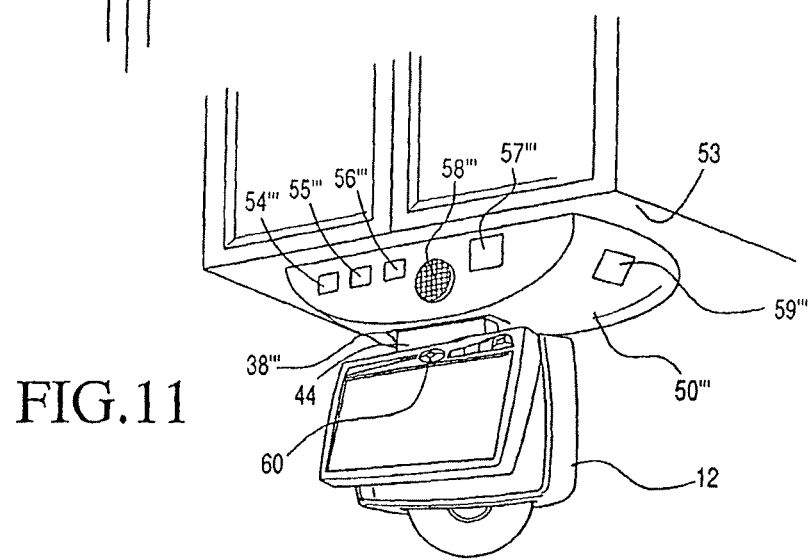

VEHICLE ENTERTAINMENT SYSTEM

CROSS REFERENCE TO RELATED APPLICATION

This application is a continuation of U.S. application Ser. No. 12/103,428, filed Apr. 15, 2008, which is a continuation-in-part of U.S. patent application Ser. No. 11/177,405, filed Jul. 11, 2005, which issued as U.S. Pat. No. 7,604,273 on Oct. 20, 2009, which claims the benefit of U.S. Provisional Application Ser. No. 60/690,874, filed Jun. 16, 2005, and U.S. patent application Ser. No. 11/177,405 is a continuation-in-part of U.S. patent application Ser. No. 10/982,896, filed Nov. 8, 2004, which is now abandoned, which claims the benefit of U.S. Provisional Patent Application No. 60/517,862, filed Nov. 7, 2003.

BACKGROUND OF THE INVENTION

1. Field of the Invention

The invention relates to a vehicle entertainment system. More particularly, the invention relates to an entertainment system integrating a video source and video monitor within the ceiling of an automobile, wherein the video source and video monitor are detachably secured to the ceiling of an automobile.

2. Description of the Related Art

Entertainment systems for automobiles are well known. As such, many advances have been made in the development of entertainment systems that make the otherwise tedious task of riding in an automobile more bearable. In addition to the development of overhead systems pioneered by the present inventor, systems that mount within the headrest of an automobile have also been developed.

These headrest entertainment systems allow multiple individuals to view a variety of different video sources within the same vehicle. However, and as those skilled in the art will certainly appreciate, it is desirable to provide added versatility to these entertainment system. The present invention attempts to accomplish this by providing a system whereby the video system may be selectively removed from an automobile and used at other locations.

SUMMARY OF THE INVENTION

It is, therefore, an object of the present invention to provide a vehicle entertainment system including a video system having a video monitor and a cradle secured within a vehicle. The cradle is shaped and dimensioned for selectively receiving and securely holding the video system. The cradle includes a docking port with a faceplate that is substantially flush with an upper end of a seat back of an automobile.

It is also an object of the present invention to provide a vehicle entertainment system wherein the video system includes a video source, and the video source is a DVD player or hard drive.

It is another object of the present invention to provide a vehicle entertainment system wherein the video system includes electrical connectors shaped and dimensioned for selective engagement with electrical connectors formed within the cradle.

It is a further object of the present invention to provide a vehicle entertainment system wherein the cradle includes a primary recess into which the video system is mounted.

It is yet a further object of the present invention to provide a vehicle entertainment system including at least one docking station to which the video system may be selectively secured when not coupled to the cradle.

It is still a further object of the present invention to provide a vehicle entertainment system wherein the video system includes electrical connectors shaped and dimensioned for selective engagement with electrical connectors formed within the docking station.

It is also an object of the present invention to provide a vehicle entertainment system wherein the video system includes a base selectively secured to the cradle, and the base includes a means for pivoting the video monitor.

It is another object of the present invention to provide a vehicle entertainment system including a cover for covering the cradle when it is not in use.

It is a further object of the present invention to provide a vehicle entertainment system wherein the cover includes a power source.

Other objects, advantages and salient features of the invention will become apparent from the following detailed description, which taken in conjunction with the annexed drawings, discloses a preferred, but non-limiting, embodiment of the subject invention.

BRIEF DESCRIPTION OF THE DRAWING

FIG. 2 is a cross sectional view of the housing of the video system shown in FIG. 1.

FIGS. 3 and 4 are front perspective views showing the entertainment system with the video system coupled to the headrest and detached from the headrest.

FIG. 9 shows the video system of FIG. 1 mounted within a dash docking station.

FIG. 10 shows the video system of FIG. 1 mounted within a mobile docking station.

FIG. 11 shows the video system of FIG. 1 mounted within a static docking station.

DESCRIPTION OF THE PREFERRED EMBODIMENTS

Figure 1:
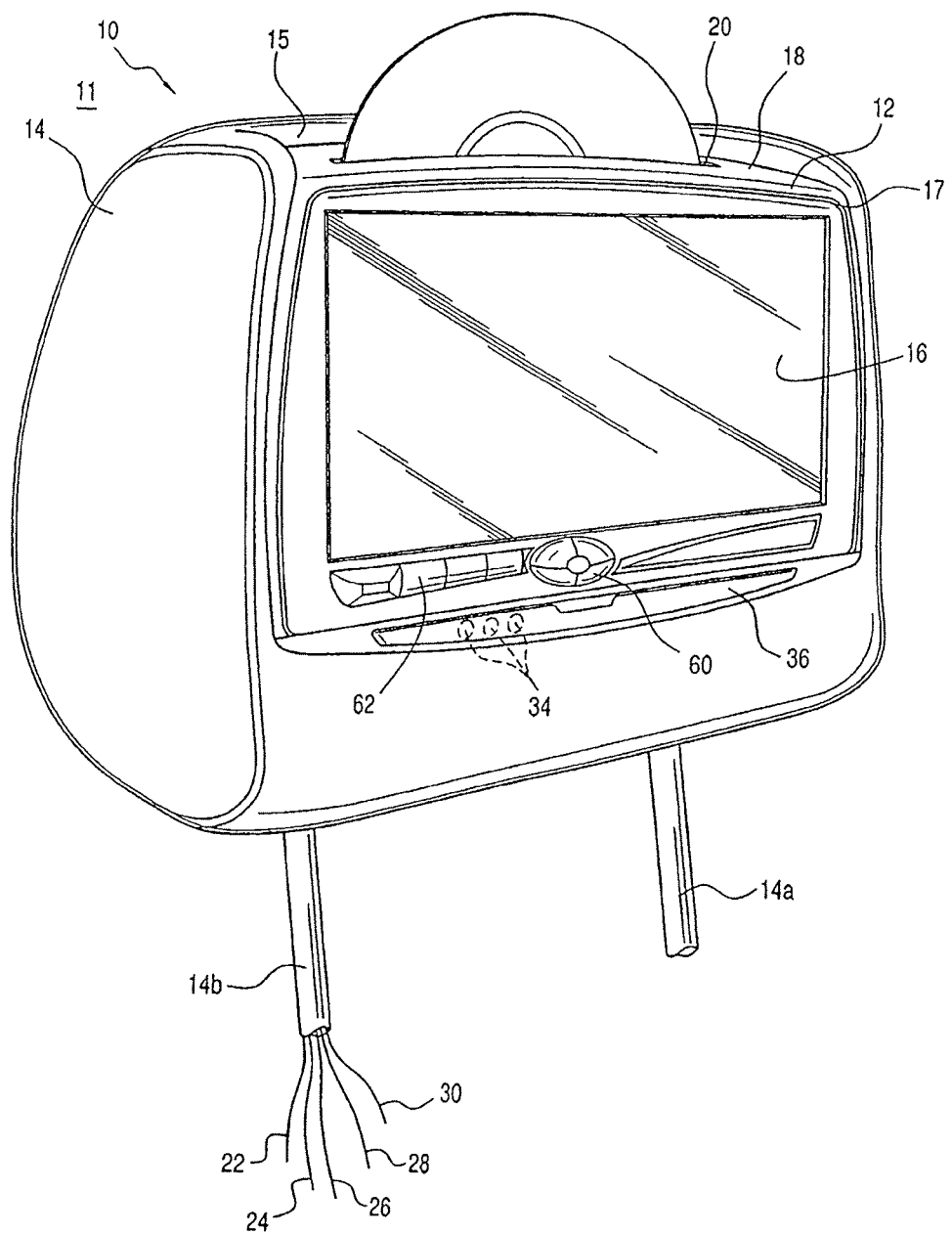
FIG. 1 is a front perspective view of an automobile entertainment system in accordance with the present invention.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

With reference to FIGS. 1 to 11, and in accordance with a first embodiment of the present invention, an automobile entertainment system 10 is disclosed. The automobile entertainment system 10 is composed of a series of video and audio components integrated within an automobile 11. As those skilled in the art will certainly appreciate, the various embodiments of the present entertainment system are disclosed herein with reference to their use within an automobile. However, the entertainment system could certainly be used in other vehicles, for example, boats or planes, without departing from the spirit of the present invention.

In particular, the automobile entertainment system 10 includes a video system 12 detachably mounted within a standard headrest 14 of an automobile 11. The video system 12 generally includes a video monitor 16 for presenting video content and a video source 20 integrated therewith.

In accordance with a preferred embodiment of the present invention, the video source is a DVD player 20 coupled to the video monitor 16 for the transmission of video content thereto. That is, the DVD player 20 or other video source is integrated within the same housing 18 as the video monitor 16. It is also contemplated that a hard drive 23 video source may also be integrated with the video monitor 16. As those skilled in the art will certainly appreciate, the hard drive 23 will include inputs for receiving video content and outputs for transmitting video content to the video monitor 16, both of which are well known to those skilled in the art. However, and as discussed below in greater detail, the video source may take a variety of forms without departing from the spirit of the present invention; for example, and not limited to, satellite video systems and Bluetooth wireless based systems.

The video system 12 is mounted along the rear portion of the headrest 14 such that an individual sitting in the rear seat of the automobile 11 may watch the media presented on the video monitor 16 without disturbing the driver of the automobile 11.

The video monitor 16, DVD player 20 and associated control components are mounted within the housing 18. As those skilled in the art will certainly appreciate, the video monitor 16 is pivotally mounted within a recess 17 formed in the housing 18. In accordance with a preferred embodiment, the video monitor 16 is a TFT LCD screen. However, it is contemplated that other monitor constructions, for example, plasma, Ultra High Definition VGA, touch screen VGA, organic LED, fabric based monitors (e.g., flexible TFT) etc., may be used without departing from the spirit of the present invention.

Although the present invention is disclosed herein as including a single monitor, it is contemplated the system could be designed with dual monitors for viewing from opposite sides of the vehicle. Such a system could include distinct DVD players associated with each monitor or a single DVD player linked to both monitors.

With regard to the DVD player 20, it is integrally molded within the housing 18 and positioned for insertion of DVDs behind the video monitor 16. By mounting the DVD player 20 in this way, a stable structure is developed that is well adapted for the automobile environment.

Figure 5:
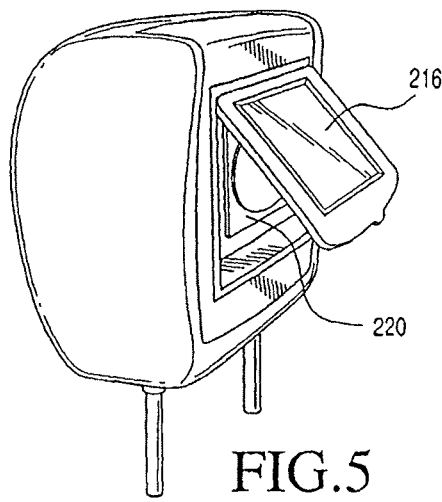
FIGS. 5, 6, 7 and 8 are views of entertainment systems in accordance with alternate embodiments of the present invention.
Figure 6:
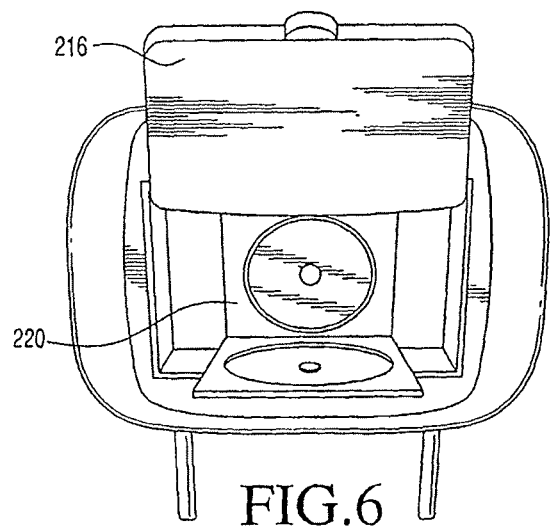
Figure 7:
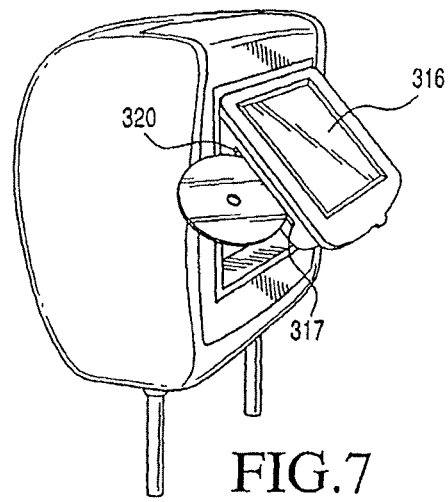
Figure 8:
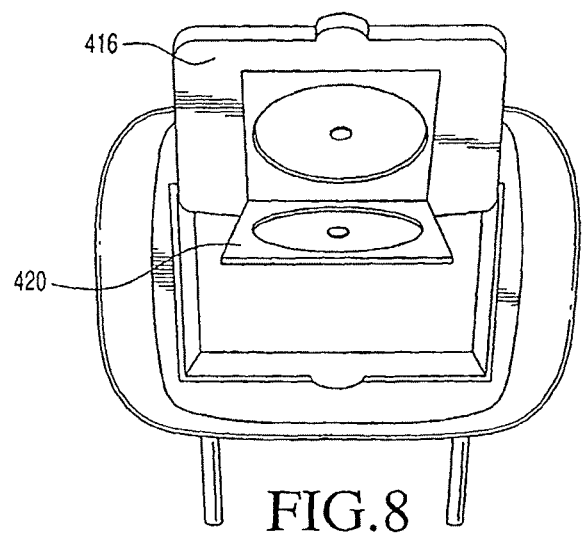
Figure 12:
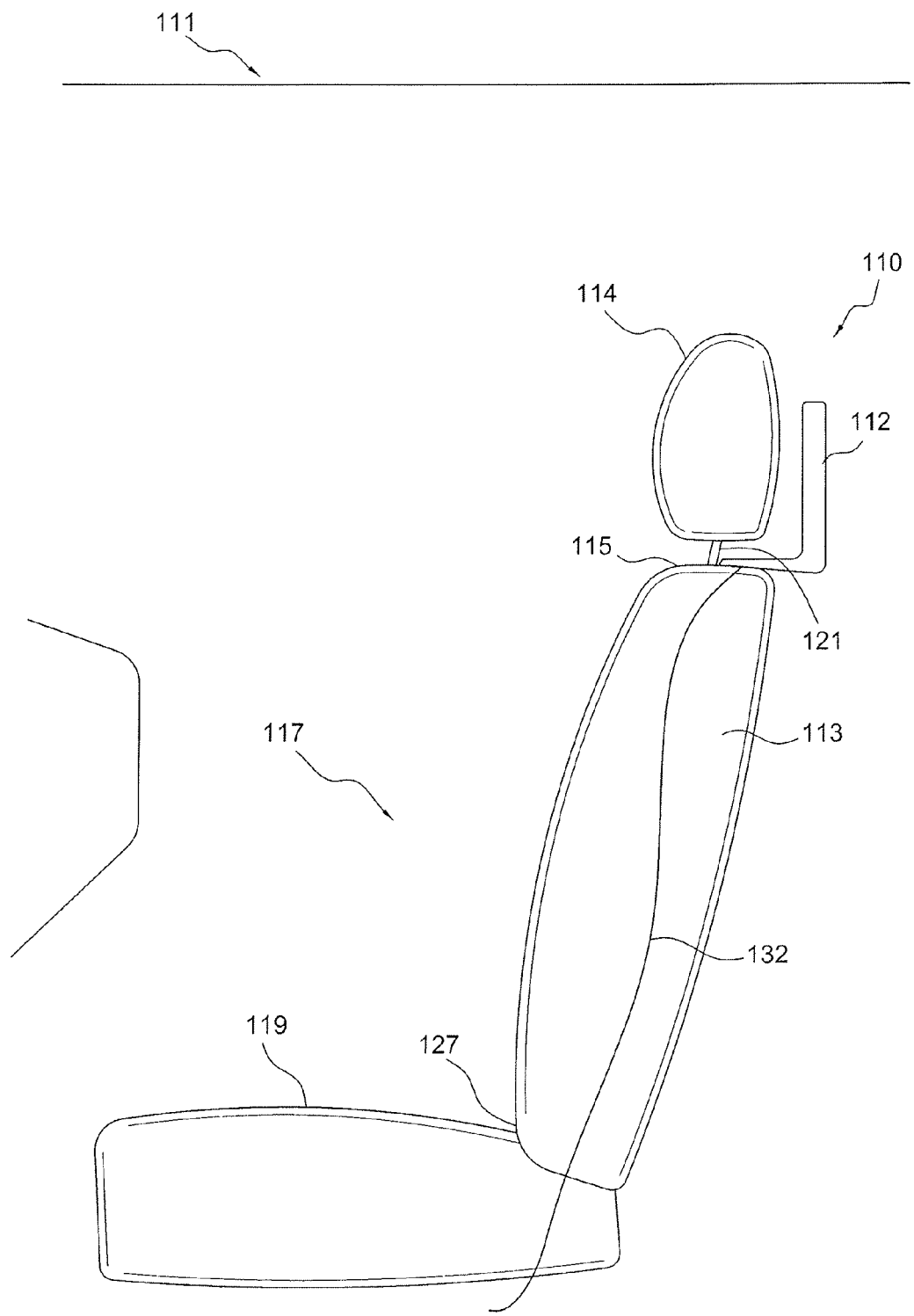
FIG. 12 is a side view of a vehicle seat incorporating an automobile entertainment system in accordance with an alternate embodiment of the present invention.
Figure 13:
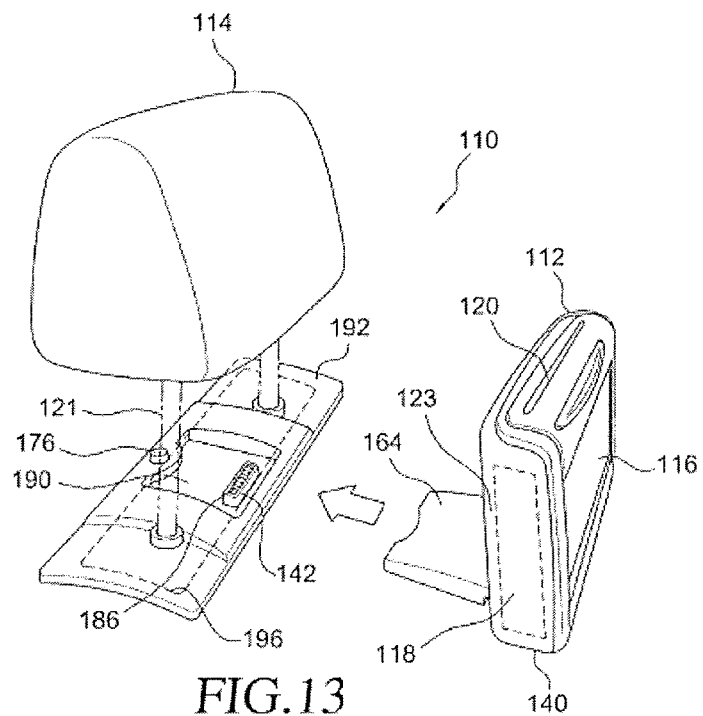
FIG. 13 is a detailed view of the automobile entertainment system shown in accordance with FIG. 12.
Figure 14:
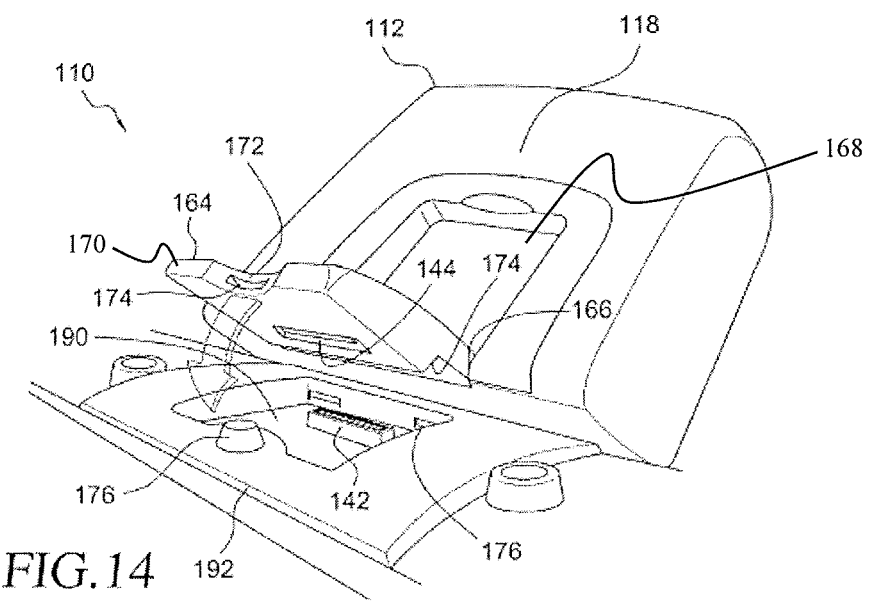
FIG. 14 is a perspective view showing installation of the video system utilized in conjunction with the automobile entertainment system shown with reference to FIG. 12.
Figure 15:
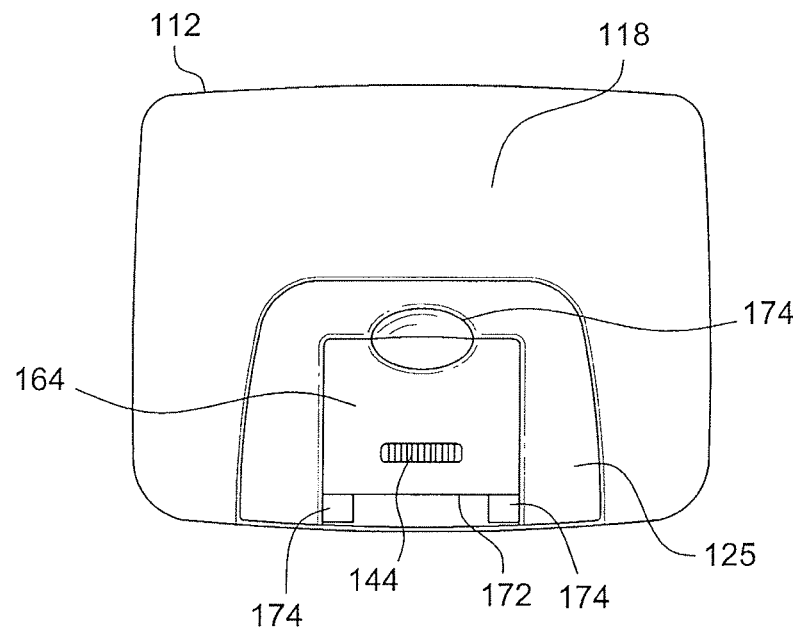
FIGS. 15 and 16 are respectively a rear view and a side view of the video system of the automobile entertainment system shown with reference to FIG. 12.
Figure 16:
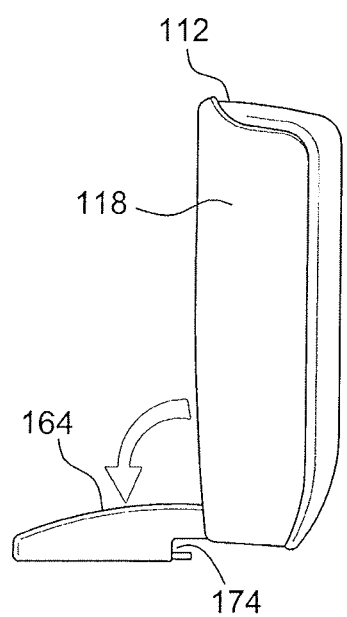
Figure 17:
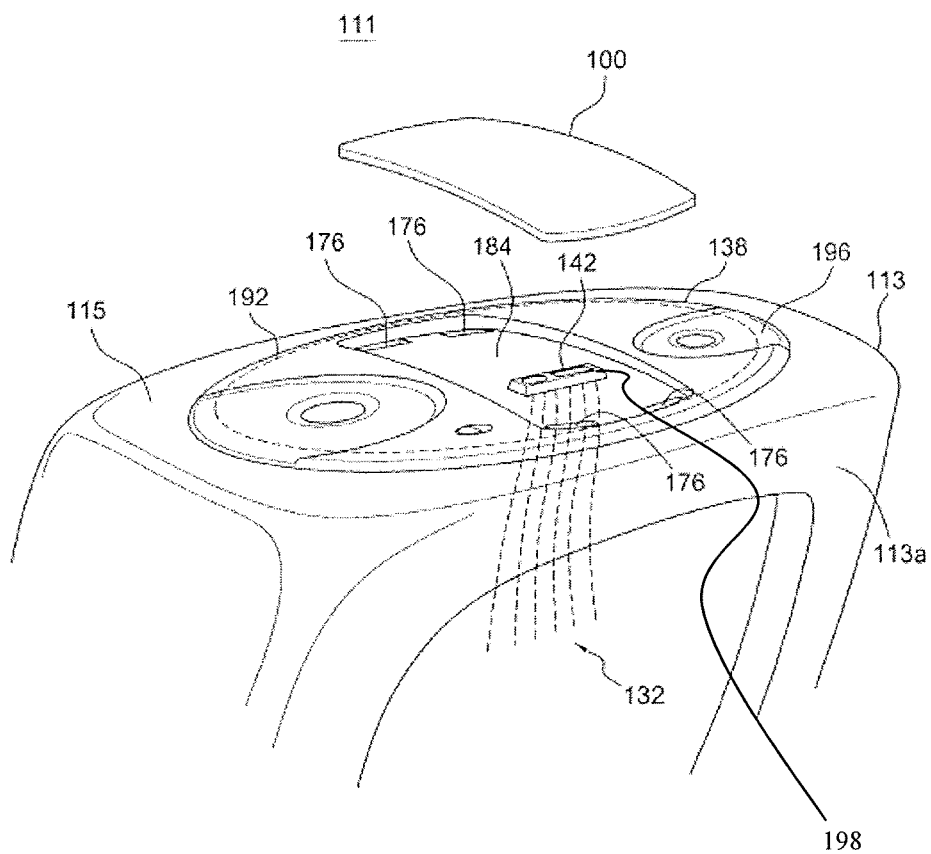
FIG. 17 is a perspective view showing the cradle of the automobile entertainment system with video system removed and a cover being selectively secured thereto.

While the DVD player 20 is disclosed as being a slot-loaded design with insertion behind the video monitor, the DVD player could take a variety of other forms while still being integrated with the video monitor 16. With reference to FIGS. 5 and 6, the DVD player 220 may be positioned beneath the pivotally mounted video monitor 216. With reference to FIG. 7, the DVD player 320 may be integrated with the video monitor 316 and facilitate access via a side loading slot 317. Referring to FIG. 8, the DVD player 420 is integrated with the underside of the video monitor 416 and the DVD is snapped into DVD player 420 when the monitor 416 is pivoted upward. In addition, the DVD player may be designed with a built-in TV tuner for providing the user with a choice of video sources.

As briefly mentioned above, the housing 18 is detachably secured to the headrest 14. In particular, the housing 18, including the video monitor 16, DVD player 20 and other related components, is detachably mounted within a recess 15 formed in the headrest 14. As such, the video system 12 may be removed from the automobile 11 and used at a variety of locations apart from the automobile 11. As will be discussed below in greater detail, the video system 12 may be used alone or in conjunction with a docking station 50', 50'', 50'''. Once removed, the video system 12 may be used in other automobiles 11 or within an individual's home. When used alone, a battery pack may be connected to the video system 12 and the video system 12 can thereby become a portable entertainment system.

A cradle 38 shaped and dimensioned for receiving the video system 12 is provided within the recess 15 of the headrest 14. As will be discussed below in greater detail, similar cradles 38', 38'', 38''' may be provided at other locations permitting use of the video system 12 at other remote locations. It is contemplated that such a cradle 38, 38', 38'', 38''' would be much like the docking stations utilized with laptop computers wherein individuals are permitted to readily remove the laptop from a docking station for use at another location remote from the docking station.

More specifically, the cradle 38 utilized in the headrest 14 includes quick release electrical connections 42 for the audio input 22, audio output 24, video input 26, video output 28 and power supply 30 (although one embodiment contemplates a system which connects only to a power supply). The video system 12 similarly includes mating electrical connections 44 for transmitting electricity and a/v signals between the cradle 38 and the video system 12. In particular, when the video system 12 is mounted upon the cradle 38, the respective electrical connections 42, 44 mate to provide for the transmission of power and a/v signals between the video system 12 and the cradle 38. As those skilled in the art will certainly appreciate, other readily removable electrical connections for other purposes may also be supplied if one determines they are so needed.

In addition to the electrical connections 42 provided on the cradle 38, the cradle 38 also includes a connecting mechanism 46 designed for selectively retaining the video system 12 within the cradle 38. The connecting mechanism 46 permits ready and selective attachment of the video system 12 to the headrest 14 while preventing vibrations and other damaging movements that commonly occur in an automobile 11.

In accordance with a preferred embodiment of the present invention, the connecting mechanism 46 includes a release button 47 and a latch member 48. The release button 47 is actuated to rotate the latch member 48 and permit removal of the video system 12 from the cradle 38. Insertion of the video system 12 within the headrest 14 is achieved by simply setting the video system 12 within the cradle 38 and applying sufficient force to the video system for overcoming the rotational force of the latch member 48 to force the video system 12 into a secure position. While a particular coupling structure is disclosed in accordance with a preferred embodiment of the present invention, those skilled in the art will appreciate that a variety of selectively releasable coupling structures may be employed without departing from the spirit of the present invention.

The automobile entertainment system 10 further includes cables 32 extending through the headrest 14. These cables ultimately link audio, video and power to the cradle 38 and video system 12. More specifically, the cradle 38 and video system 12 are electrically connected to the remainder of the automobile 11 via electrical communication lines extending through one or both of the extension arms 14a, 14b of the headrest 14. For example, and as will be discussed below in substantial detail, a video input 22, video output 24, audio input 26, audio output 28 and power source 30, may be respectively connected to the cradle 38 for ultimate connection with the video system 12 via the mating electrical connections 42, 44 of the respective cradle 38 and video system 12.

Specific wiring arrangements and linking of various video systems within an automobile in accordance with preferred embodiments of the present invention are disclosed in U.S. patent application Ser. No. 10/920,425, entitled "AUTOMOBILE ENTERTAINMENT SYSTEM", filed Aug. 18, 2004, which is incorporated herein by reference, U.S. patent application Ser. No. 10/895,111, entitled "AUTOMOBILE ENTERTAINMENT SYSTEM", filed Jul. 21, 2004, which is incorporated herein by reference, U.S. patent application Ser. No. 10/895,110, entitled "AUTOMOBILE ENTERTAINMENT SYSTEM LINKING MULTIPLE VIDEO SYSTEM FOR COORDINATED SHARING OF VIDEO CONTENT", filed Jul. 21, 2004, which is incorporated herein by reference, U.S. patent application Ser. No. 10/895,086, entitled "HOUSING FOR AN AUTOMOBILE ENTERTAINMENT SYSTEM", filed Jul. 21, 2004, which is incorporated herein by reference, U.S. patent application Ser. No. 10/895,099, entitled "INSTALLATION APPARATUS FOR AN AUTOMOBILE ENTERTAINMENT SYSTEM", filed Jul. 21, 2004, which is incorporated herein by reference, U.S. patent application Ser. No. 10/920,431, entitled "AUTOMOBILE ENTERTAINMENT SYSTEM", filed Aug. 18, 2004, which is incorporated herein by reference, and U.S. patent application Ser. No. 10/920,430, entitled "AUTOMOBILE ENTERTAINMENT SYSTEM", filed Aug. 18, 2004, which is incorporated herein by reference.

As briefly mentioned above, a DVD player 20 is integrated with the video monitor 16 to form the video system 12 of the present invention. The DVD player 20 is integrated with the video monitor 16 to facilitate convenient viewing of media on the video monitor 16 while also conserving space within the limited confines of the automobile 11. For example, by integrating the DVD player 20 with the video monitor 16 individuals using the video monitor 16 may conveniently insert DVDs within the video system 12 without reaching within another part of the automobile 11.

With this in mind, it is contemplated the present video system 12 may be positioned within any headrest 14 employed in a car, truck, SUV, or van. The video system 12 may be placed within all vehicle headrests (and, with regard to automobiles having three rows of seats, video systems may be positioned within both the front seat headrests and the second seat headrests). In this way, individuals sitting on opposite sides of an automobile 11 can watch different video content on different video systems 12. In fact, different videos may be viewed, and wireless headphones may still be employed, by utilizing a multi-channel IR transmitter in conjunction with the present system.

The present video system 12 is provided with the ability to offer a variety of functionalities. These functionalities may be hardwired or programmed within the video system 12 or the functionalities may be added in a modular manner via an expansion slot 40 provided within the video system 12. Contemplated functionalities include, but are not limited to satellite radio (for example, Serius, XM), Pictel phone, satellite television (for example, DirecTV), GPS guidance systems, quick release battery packs, memory cards, wireless Internet access (for example, Wi-Fi), Bluetooth, digital video recorders, digital video reception and recording, digital video inputs, video conferencing, cellular digital, cellular digital with a camera, USB capabilities, Blue sphere, hot swap hard drive, satellite video import card, wireless video import card, etc.

Enhanced usage is further provided by the inclusion of RCA ports 34, or other a/v input/outputs, formed within the cradle 38 and contained behind a cover 36 which may be selectively opened to reveal the ports 34. The inclusion of these ports 34 allows for ready attachment of the present video system 12 to other remote a/v sources (for example, game consoles, portable digital music players, etc.).

In addition, and in accordance with a preferred embodiment, a broadcast television receiver 19 is integrated with the video monitor 16 and/or the headrest 14. More particularly, and with reference to FIG. 2, the housing 18 is provided with a rear recess 37 shaped and dimensioned for receiving a television receiver 19. The television receiver 19 may, therefore, be wired for use in conjunction with the video monitor 16 in a manner known to those skilled in the art.

The television receiver 19 is further provided with an antenna 21. The antenna 21 is electrically connected to the television receiver 19 for the transmission of over-the-air signals. The antenna 21 is substantially U-shaped and is wrapped about the housing 18. While a U-shaped antenna wrapped about the housing is disclosed in accordance with a preferred embodiment of the present invention, the antenna may be oriented within a variety of locations within the headrest without departing from the spirit of the present invention.

Control of the video system 12, including the video monitor 16, DVD player 20 and other components of the video system 12, is facilitated by the provision of control buttons along the outer surface of the video system 12. In accordance with a preferred embodiment of the present invention, the control buttons take the form of a multifunction controller 60 permitting movement of a cursor shown upon various interfaces displayed upon the video monitor 16. In addition, conventional control buttons 62 may also be provided for control of traditional functions. In addition to the provision of manual control buttons 62, the video system 12 may further include a remote control (not shown) such that an individual need not actually touch the video system 12 to control the video content or the volume generated by the video system 12. Once again, and as those skilled in the art will certainly appreciate, a variety of remote control systems may be utilized without departing from the spirit of the present invention.

As briefly mentioned above, the present video system 12 is adapted for removal from the headrest 14 of an automobile 11 for use at a variety of other locations. In accordance with a preferred embodiment of the present invention, the other locations are provided with a docking station 50', 50", 50''' including auxiliary cradles 38', 38", 38''' shaped and dimensioned for receiving the video system 12 and coupling the video system 12 to power sources and a/v sources in a manner similar to the cradle 38 used in conjunction with the headrest 14.

For example, and with reference to FIG. 9, a docking station 50' for use in conjunction with the dash 52 of a conventional automobile 11 is disclosed. The docking station 50' includes an auxiliary cradle 38' (with electrical connections and a connecting mechanism (not shown)) shaped and dimensioned for receiving and securely holding the video system 12 and coupling the video system 12 to power sources and a/v sources in a manner similar to the cradle 38 used in conjunction with the headrest 14. The docking station 50' is mounted upon the dash 52 of an automobile 11 and is wired for connection to a power source and a/v sources (not shown). In addition, the dash docking station 50' may include an integrated satellite receiver 54' for providing satellite content to the passenger of the automobile 11 by transmitting the satellite signal through the cradle 38' and into the video system 12 via the respective electrical connections of the cradle 38' and the video system 12. This embodiment is particularly useful where the video system 12 includes functionality relating to the provision of GPS guidance information. With this in mind, the driver will be able to selectively use the video system 12 for accessing guidance information when needed and return the video system 12 to the headrest 14 when guidance information is no longer needed.

With reference to FIG. 10, a mobile docking station 50" may also be provided. The mobile docking station 50" also includes an auxiliary cradle 38" (with electrical connections and a connecting mechanism (not shown)) shaped and dimensioned for receiving and securely holding the video system 12 and coupling the video system 12 to power sources and a/v sources in a manner similar to the cradle 38 used in conjunction with the headrest 14. The docking station 50" may include a battery pack 55", a/v inputs 56", a/v outputs 57", internet capability, speakers 58", cable input 59" and/or an integrated satellite receiver 54". These components are linked to the video system 12 via the cradle 38" which transmits the relevant signals to and from the video system 12 via the respective electrical connections of the cradle 38" and the video system 12.

With reference to FIG. 11, yet a further embodiment of a docking station 50''' is disclosed. This docking station 50''' is adapted for static mounting within a household, office or other locations (for example, beneath a kitchen cabinet 53). The docking station 50''' includes an auxiliary cradle 38''' (with electrical connections and a connecting mechanism (not shown)) shaped and dimensioned for receiving and securely holding the video system 12 and coupling the video system to power sources and a/v sources in a manner similar to the cradle 38 used in conjunction with the headrest 14. The docking station 50''' may include a battery pack 55''', a/v inputs 56''', a/v outputs 57''', Internet capability, speakers 58''', cable input 59''' and/or an integrated satellite receiver 54'''. These components are linked to the video system 12 via the cradle 38''' which transmits the relevant signals to and from the video system 12 via the respective electrical connections of the cradle 38''' and the video system 12.

As shown in FIG. 11, when the video system 12 is mounted beneath a kitchen cabinet 53 as shown, it may be necessary to mount the video system 12 upside down when compared to its mounting within an automobile headrest 14. With this in mind, the video system 12 is provided with the ability to rotate to the image shown on the video monitor 16 so that the video system 12 may be used in a variety of orientations. The possible rotation of the image shown on the video monitor 16 is complemented by the multifunctional controller 60 that adjusts to rotation of the image such that the controller 60 is calibrated to function in accordance with the orientation of the screen image.

In addition to providing for the inclusion of a removable video system 12 directly within the headrest 14 of an automobile 11 as shown above with reference to FIGS. 1 to 11, it is further contemplated to provide an automobile entertainment system 110 providing for a selectively removable video system 112 mounted adjacent to the headrest of the automobile.

Referring to FIGS. 12-18, an alternate video system 112 and mounting structure are disclosed. The video system 112 is adapted for selective mounting within the seat back 113 of an automobile 111 adjacent to the headrest. This is achieved by providing a video system 112 having a limited profile and a low profile cradle 138 preferably mounted to the upper end 115 of the seat back 113 at a location adjacent to the headrest 114. In particular, and as those skilled in the art will certainly appreciate, a conventional automobile seat 117 includes a substantially horizontal sitting surface 119 and a seat back 113 extending upwardly therefrom. The seat back 113 includes a lower end 127 positioned adjacent the horizontal sitting surface 119 and substantially horizontal (that is, when the seat back 113 is in its upright orientation) upper end 115. Extending from the upper end 115 of the seat back 113 is a headrest 114 which is adjustably supported relative to the seat back 113 by one or more upwardly extending support posts 121.

As with the embodiment disclosed above, the video system 112 is detachably mounted within a cradle 138 secured to the seat back of an automobile 111 at a position adjacent to the headrest 114. The video system 112 generally includes a video monitor 116 for presenting media content and a video source 120 integrated therewith.

In accordance with a preferred embodiment of the present invention, the video source is a DVD player 120 coupled to the video monitor 116 for the transmission of video content thereto. That is, the DVD player 120 or other video source is integrated within the same video housing 118 as the video monitor 116. It is also contemplated that a hard drive 123 video source may also be integrated with the video monitor 116. As those skilled in the art will certainly appreciate, the hard drive 123 will include inputs for receiving video content and outputs for transmitting video content to the video monitor 116, both of which are well known to those skilled in the art. However, and as discussed above with reference to the prior embodiments, the video source may take a variety of forms without departing from the spirit of the present invention.

The video monitor 116, DVD player 120, hard drive 123 and associated control components are mounted within the video housing 118. In accordance with a preferred embodiment, the video monitor 116 is a TFT LCD screen. However, it is contemplated that other monitor constructions, for example, plasma, Ultra High Definition VGA, touch screen VGA, organic LED, fabric based monitors (e.g., flexible TFT) etc., may be used without departing from the spirit of the present invention.

With regard to the DVD player 120, it is integrally molded within the video housing 118 and positioned for insertion of the DVDs behind the video monitor 116. By mounting the DVD player 120 in this way, a stable structure is developed that is well adapted for the automobile environment. While the DVD player is disclosed as being a slot-loaded design with insertion behind the video monitor, the DVD player could take a variety of other forms without departing from the spirit of the present invention.

The video system 112 is either detachably or fixedly mounted within a cradle 138 formed in the upper end 115 of the seat back of the automobile 111. As will be appreciate based upon the following disclosure, the design of the video system 112 and cradle 138 allows for the creation of multiple cradles 138 within an automobile, permitting selective and convenient positioning and/or installation of the video systems 112 at the various cradle 138 locations within the automobile 111.

More particularly, the base 164 of the video system 112 is selectively mounted to a cradle 138 secured to the upper end 115 of the seat back 113 of the automobile 111 in a manner that permits rotation of the video housing 118. The base 164 extends from an edge of the video housing 118. The base 164 includes a first hinge 166 that facilitates rotation of the video housing 118 about an axis substantially parallel to the upper end 115 of the seat back 113 of the automobile 111 for movement to enhance viewing for passengers of different sizes.

The first hinge 166 also provides for rotation of the base 164 between an extended position in which the base 164 is oriented for attachment to the cradle 138 in a manner allowing for use of the present video system 112 and a storage position in which the base 164 is rotated about the first hinge 166 for positioning within a recess 168 within the back wall 125 of the video housing 118. With this in mind, the recess 168 is shaped and dimensioned to fully receive the base 164 such that the base 164 is substantially continuous with the outer surface of the video housing 118 when the base is in its storage position.

The base 164 further includes a projecting attachment member 170 permitting selective coupling of the video system 112 within the cradle secured to the upper end 115 of the seat back 113 of the automobile 111. The attachment member 170 includes a fastening mechanism composed of latches 174 which fixedly secure the video system 112 to the cradle in a manner discussed below in greater detail.

Figure 19:
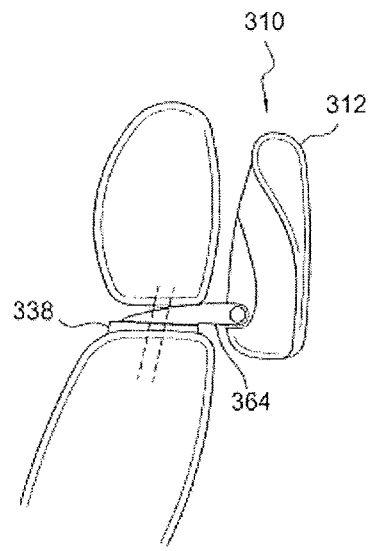
FIGS. 19 and 20 are respectively a side view and a rear view showing an alternate embodiment of the automobile entertainment system shown with reference to FIGS. 12 to 18.
Figure 20:
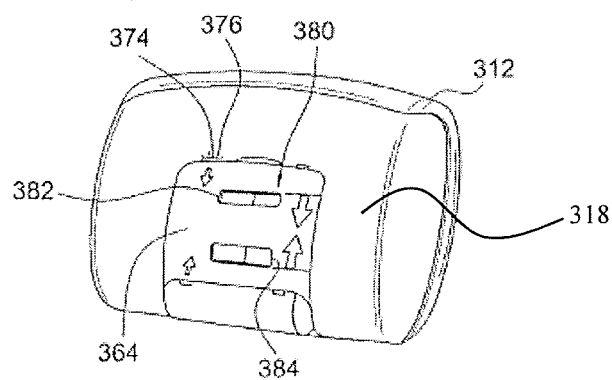

In accordance with an alternate embodiment as shown with reference to FIGS. 19 and 20, the latches 374 are integrated with a spring biased actuation mechanism 380 which permits movement of latches 374 between an extended orientation and a retracted orientation. The actuation mechanism 380 includes finger levers 382, 384 which are pushed toward one another to retract the latches 374. As such, the latches 374 may seat within recesses 376 found in the housing 318 of the video system 312 to prevent inadvertent movement of the base 364. When it is desired to move the base to its extended orientation, the finger levers 382, 384 are pressed releasing the latches 374 from within the recesses 376 and permitting rotation of the base 364. Thereafter, the latches 374 may be used in securing the base 364 to the cradle 338.

The cradle 138 is shaped and dimensioned for receiving and securing the video system 112 adjacent the headrest 114 at the upper end 115 of the seat back 113 of the automobile 111. As was discussed above with reference to the other embodiments, similar cradles may be provided at other locations permitting use of the video system 112 at other remote locations.

As with the prior embodiment, the cradle 138 utilized in accordance with a preferred embodiment of the present invention includes quick release electrical connections 142 connected to cables 132 for the audio input, audio output, video input, video output and power supply (although one embodiment contemplates a system which connects only to a power supply). The video system 112, and particularly, the base 164 of the video system 112, includes mating electrical connections 144 for transmitting electricity and a/v signals between the cradle 138 and the video system 112. In particular, when the video system 112 is mounted upon the cradle 138, the respective electrical connections 142, 144 mate to provide for the transmission of power and a/v signals between the video system 112 and the cradle 138. As those skilled in the art will certainly appreciate, other readily removable electrical connections for other purposes may also be supplied if one determines they are so needed.

In addition to the electrical connections provided on the cradle 138, the cradle 138 also includes a fastening mechanism 190 adapted for selective engagement with the fastening mechanism 172 of video system 112. The fastening mechanism 190 of the cradle 138 is composed of latch members 176 shaped and dimensioned for receiving latches 174 in a manner discussed below in greater detail. Where a more permanent connector between the video system and cradle is desired, screws and screw holes in the cradle may be employed as shown with reference to the embodiment shown in FIGS. 21 and 23.

The usefulness of the present embodiment is enhanced by the fact that the cradle 138 is formed with a low profile that substantially conforms to the shape of the upper end 115 of the seat back 113 of the automobile 111. More particularly, each cradle 138 installed within an automobile 111 is positioned such that the faceplate 192 conforms with the upper end of the seat back. With this in mind, the cradle 138 is constructed with a metal mounting plate 196 directly secured to the upper end of the seat back of the automobile 111 and a docking port 198 secured thereto. The docking port 198 includes the electrical and mechanical components discussed above which allow for the direct attachment of the video system 112 thereto.

Figure 18:
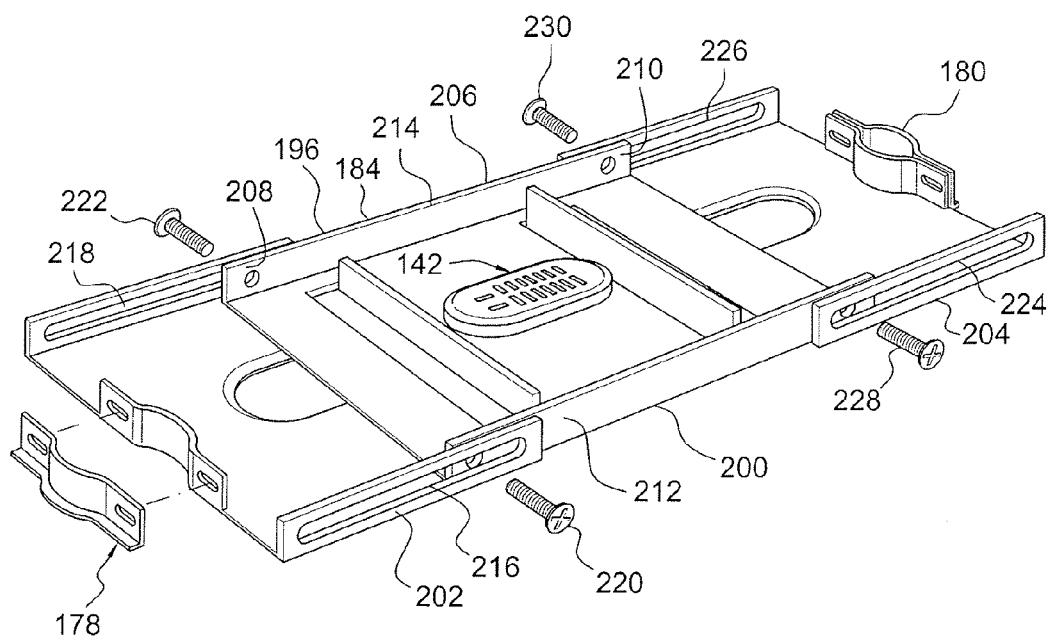
FIG. 18 is a perspective view of the mounting bracket utilized in conjunction with the automobile entertainment system shown with reference to FIG. 12.

More particularly, and with reference to FIG. 18, the mounting plate 196 is shaped and dimensioned to extend laterally across the upper end 115 of the seat back 113. With this in mind, the mounting plate 196 includes first and second laterally clamp members 178, 180 for engaging the support posts 121 of the headrest 114 and securing the mounting plate 196 thereto. In this way, the mounting plate 196 sits substantially between the upper end 115 of the seat back 113 and the lower portion of the headrest 114. The mounting plate 196 also includes a central section 184 in which the docking port 186 is positioned.

The mounting plate 196 is desired for attachment to a variety of automobile seat structures. As such, the mounting plate 196 is formed with a three-piece construction allowing for adjustments to accommodate a variety of seat sizes. The mounting plate 196 includes a central member 200, a first lateral member 202 and a second lateral member 204. The first and second lateral members 202, 204 are secured to opposite sides of the central member 200 for adjustment relative thereto. In addition, the central member 200 includes upwardly extending walls 206 along the perimeter thereof which function to define a mounting area in which the base 164 of the video system 112 may be mounted.

More particular, the central member 200 includes a first lateral side 208, a second lateral side 210, a front side 212 and a rear side 214. The first lateral member 202 is secured to the central member 200 along the first lateral side 208 and the second lateral member 204 is secured to the central member 200 along the second lateral side 210. The first lateral member 202 is secured to the first lateral side 208 in a manner allowing one to selectively move the first lateral member relative to the central member 200. This is achieved by providing the first lateral member 202 with forward and rearward tracks 216, 218 in which set screws 220, 222 extending to the central member 200 ride allowing for adjustment of the first lateral member 202 relative to the central member 200. When a desired orientation is achieved, the set screws 220, 222 are tightened securing the first lateral member 202 in position relative to the central member 200. Similarly, the second lateral member 204 is secured to the second lateral side 210 in a manner allowing one to selectively move the second lateral member 204 relative to the central member 200. This is achieved by providing the second lateral member 204 with forward and rearward tracks 224, 226 in which set screws 228, 230 extending from the central member 200 ride allowing for adjustment of the second lateral member 204 relative to the central member 200. When a desired orientation is achieved, the set screws 228, 230 are tightened securing the second lateral member 204 in position relative to the central member 200.

Adjustability of the first and second lateral members 202, 204, and ultimately the entire mounting plate 196 is achieved by provided each of the first and second lateral members 202, 204 with clamping members 178, 180 at opposite ends of the adjustable mounting plate 196. The clamping member 178, 180 allow for the passage of headrest support posts 121, which are differently spaced, to pass through the mounting plate 196 regardless of the orientation of the first and second lateral members 202, 204 relative the central member 200.

The installation of the cradle 138 is intended to provided for an aesthetically pleasing appearance and the ceiling docking port 198 is, therefore, provided with a faceplate 192 which substantially aligns with and is, therefore, conforming with the upper end 115 of the seat back 113 of the automobile 111. Aesthetics are further enhanced by the provision of a cover member 100 which may be selectively placed over the docking port 198 when it is not in use. The cover member is preferably frictionally engaged with docking port 198 when positioned for covering. As shown with reference to FIG. 17, the cover member may be a simple cover 100. However, it is also contemplated the cover may be a powered cover with various power sources extending therefrom or an illuminating cover with lights as disclosed in commonly owned U.S. patent application Ser. No. 11/177,405, filed Jul. 11, 2005, which is incorporated herein by reference. Where the covers require power, the cover is provided with an electrical connection allowing the cover to tap into the power supply of the cradle.

As with the prior embodiments, cables 132 extend through the seat back and the cradle 138. These cables 132 ultimately link audio, video and power to the cradle 138 and video system 112. More specifically, the cradle 138 and video system 112 are electrically connected to the remainder of the automobile 111 via electrical communication lines in a manner known to those skilled in the art.

As with the prior embodiment, the video system 112 is similarly provided with a base 164 including a fastening mechanism 172 adapted for secure attachment to the cradle. As such, the mounting plate 196 includes a rear facing structure shaped and dimensioned for engagement with the mounting plate and docking port of the cradle.

In addition, the base 164 of the video system 112 is pivotally secured to and extends from the video housing 118 in which the video monitor 116 and DVD player 120 are secured. As such, the base 164 may be secured to the cradle 138 such that the video housing 118 is positioned just rearwardly of the automobile headrest 114 for viewing from the rear seat thereof.

In accordance with a preferred embodiment, and as shown with reference to the embodiment shown with reference to FIGS. 21, 22 and 23 below, when it is desirable to fixedly secure the video system to the cradle, the mounting plate is provided with screw holes through which screws are passed for engagement with threaded screw holes along the mounting plate of the cradle. In this way, the video system is fixedly secured to the cradle for utilization in conjunction with the present invention. This fixed attachment results in a system which complies with all automobile regulations relating to the utilization of headrests and the attachment of devices within an automobile passenger compartment.

While a screw fastening mechanism and removable systems have been disclosed above in accordance with a preferred embodiment, those skilled in the art will appreciate that other attachment mechanisms, for example fixed attachment mechanisms or selectively removable attachment mechanisms, may be employed without departing from the spirit of the present invention.

As discussed above, specific wiring arrangements and linking of various video systems within an automobile in accordance with preferred embodiments of the present invention are disclosed in commonly owned patent applications that are incorporated herein by reference.

The present video system 112 is provided with the ability to offer a variety of functionalities. These functionalities may be hardwired or programmed within the video system 112 or the functionalities may be added in a modular manner via an expansion slot 140 provided within the video system 112. Contemplated functionalities include, but are not limited to satellite radio (for example, Sirius, XM), Pictel phone, satellite television (for example, DirecTV), GPS guidance systems, quick release battery packs, memory cards, wireless internet access (for example, Wi-Fi), Bluetooth, digital video recorders, digital video reception and recording, digital video inputs, video conferencing, cellular digital, cellular digital with a camera, USB capabilities, Blue sphere, hot swap hard drive, satellite video import card, wireless video import card, etc.

In addition, and in accordance with a preferred embodiment, a broadcast television receiver and an antenna as discussed above with reference to the prior embodiment shown in FIG. 2 is integrated with the video system 112. The video system may also be provided with a flashlight controlled by an on/off switch, which runs off a battery (not shown) mounted within the video system 112. The video system 112 may further be provided with both a 110 V power outlet and a 12 V power outlet for connection with other electronic devices requiring power.

Control of the video system 112, including the video monitor 116, DVD player 120, hard drive 123 and other components of the video system 112, is facilitated by the provision of control buttons along the outer surface of the video system 112. In accordance with a preferred embodiment of the present invention, the control buttons take the form of a multifunction controller 160 permitting movement of a cursor shown upon various interfaces displayed upon the video. In addition, conventional control buttons 162 may also be provided for control of traditional functions. In addition to the provision of manual control buttons, the video system 112 may further include a remote control (not shown) such that an individual need not actually touch the video system 112 to control the video content or the volume generated by the video system 112.

Figure 21:
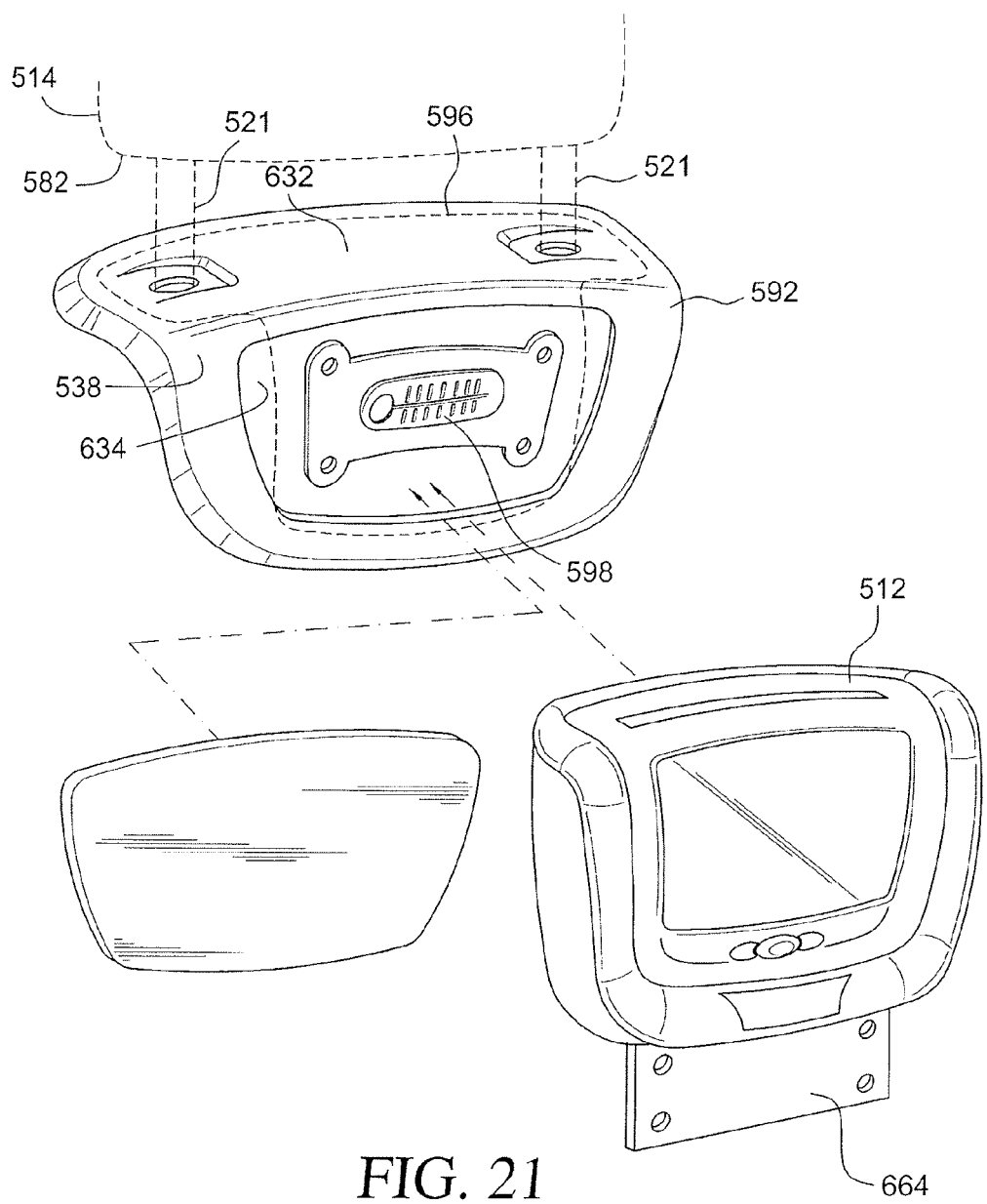
FIG. 21 is an exploded view of an automobile entertainment system in accordance with yet another embodiment.
Figure 22:
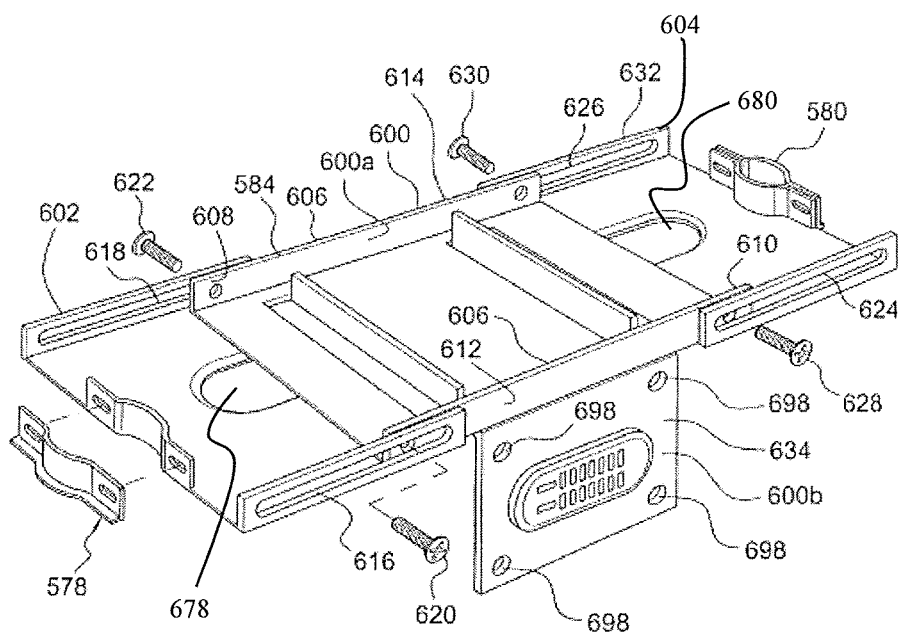
FIG. 22 is a perspective view of the mounting bracket utilized in conjunction with the automobile entertainment system shown with reference to FIG. 21.
Figure 23:
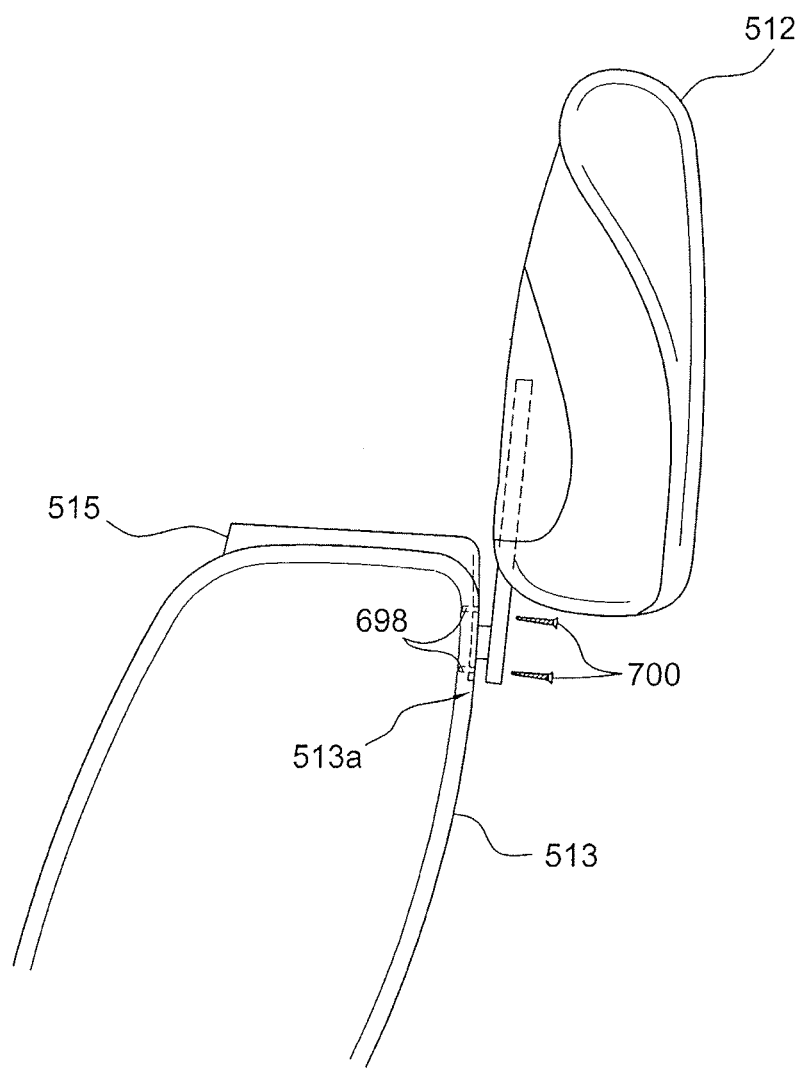
FIG. 23 is a side view showing mounting of the video system to the cradle of the embodiment shown with reference to FIG. 21.
Figure 24:
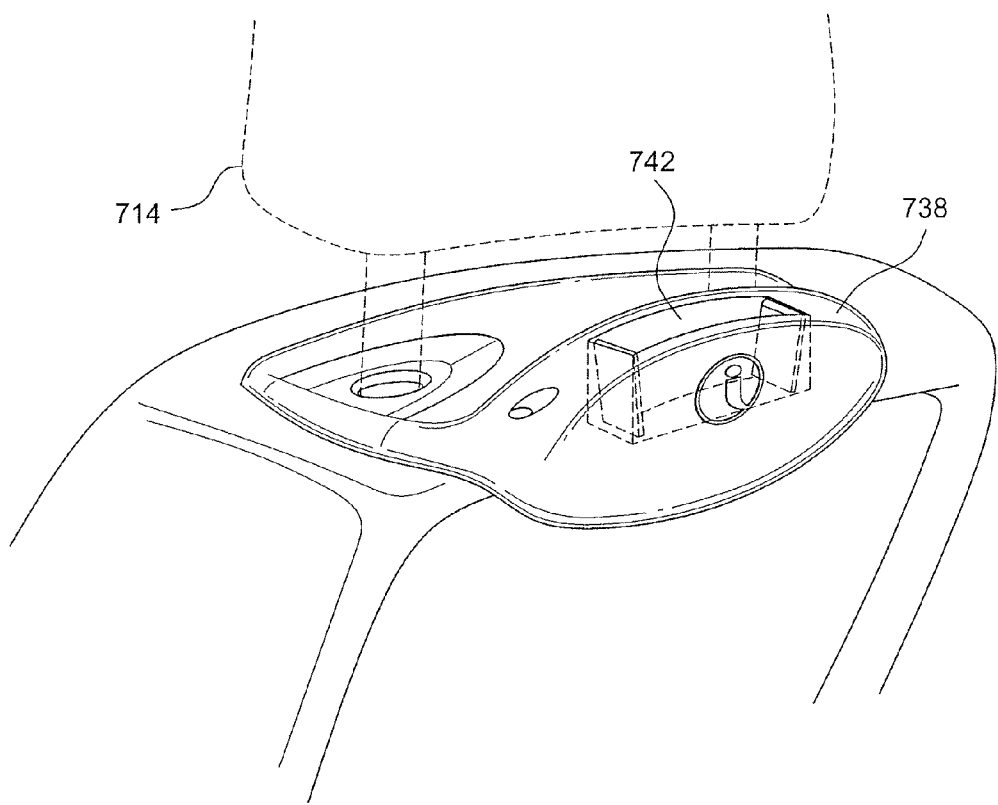
FIG. 24 is a perspective view in accordance with yet a further embodiment.
Figure 25:
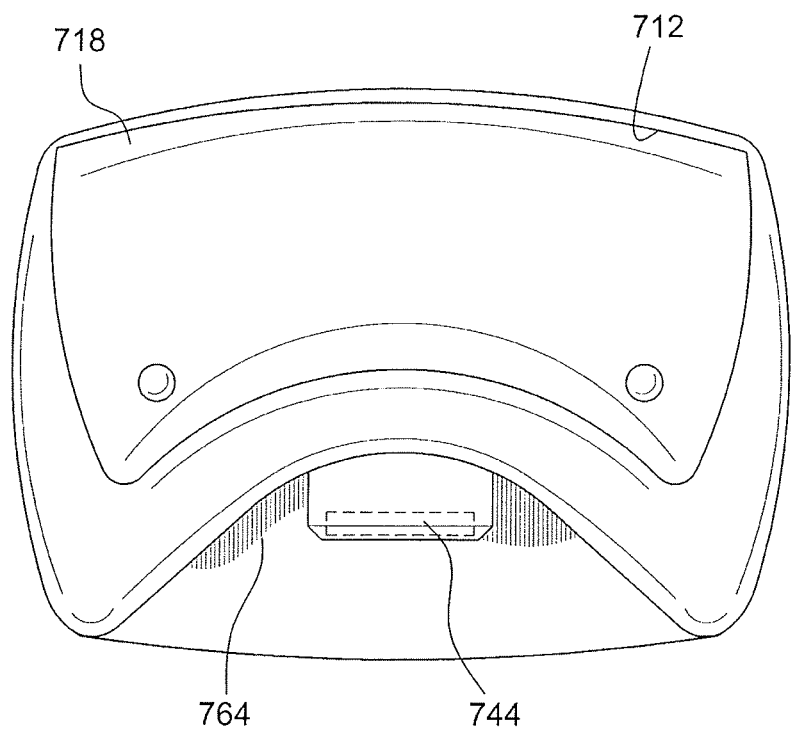
FIGS. 25 and 26 are respectively a rear view and a side view showing the video system and the video system mounted to the cradle (only shown in FIG. 26).
Figure 26:
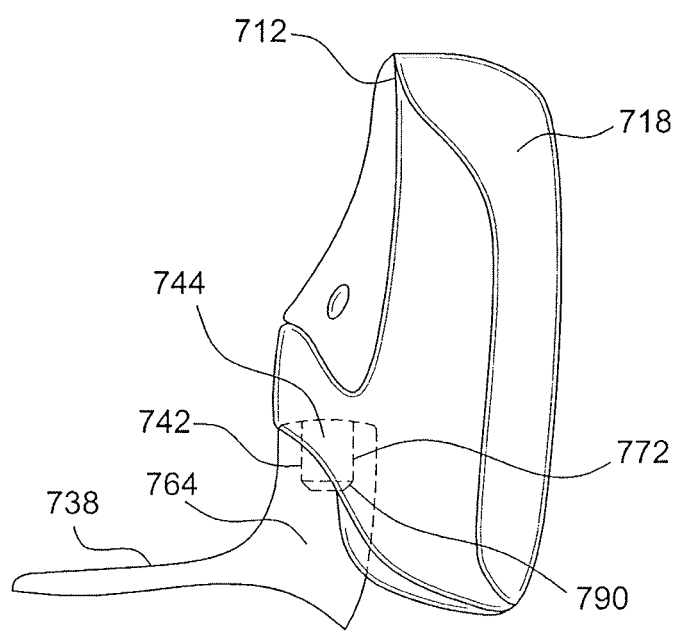
Figure 27:
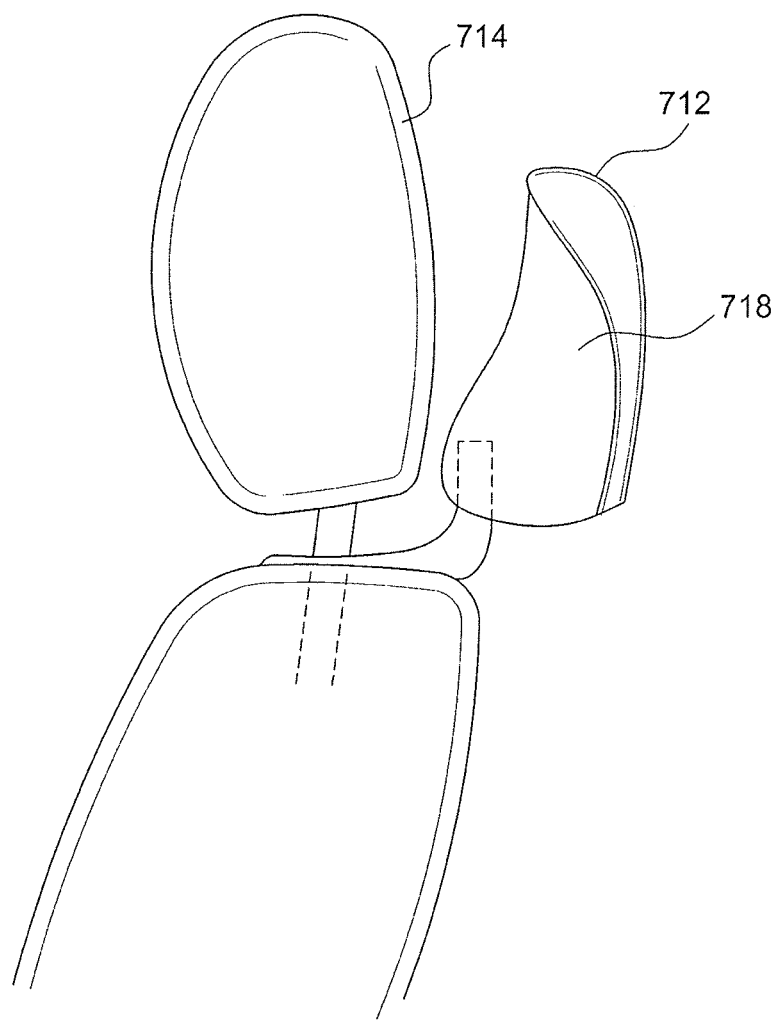
FIG. 27 is a side view of the video system shown with reference to FIG. 24.

In accordance with an alternate embodiment and with reference to FIGS. 21, 22 and 23, the mounting plate 596 and faceplate 592 are structured such that the docking port 598 faces rearwardly along the upper portion 513a of the seat back 513. In particular, the mounting plate 596 is substantially L-shaped with a first leg 632 and a second leg 634. The first leg 632 is shaped and dimensioned for attachment to the upper end 515 of the seat back 513, while the second leg 634 extends downwardly to wrap around the seat back 513 and extend along the upper portion 513a along the rear portion of the seat back 513 adjacent the upper end 515 thereof.

In particular, and with reference to FIGS. 21 and 22, the first leg 632 of the mounting plate 596 is shaped and dimensioned to extend laterally across the upper end 515 of the seat back 513. With this in mind, the first leg 632 of the mounting plate 596 includes first and second clamping members 578, 580 for engaging the support posts 521 of the headrest assembly 514. In this way, the mounting plate 596 sits substantially between the upper end 515 of the seat back 513 and the lower portion 582 of the headrest 514. The mounting plate 596 also includes a central section 584 connecting the first and second clamping members 578, 580, and from which the second leg 634 extends and in which the docking port 598 is positioned.

As with the prior embodiment, the mounting plate 596 is desired for attachment to a variety of automobile seat structures. As such, the mounting plate 596 is formed with a three-piece construction allowing for adjustments to accommodate a variety of seat sizes. The mounting plate 596 includes an L-shaped central member 600, a first lateral member 602 and a second lateral member 604. The first and second lateral members 602, 604 are secured to opposite sides of the central member 600 for adjustment relative thereto. In addition, the central member 600 includes a horizontal plate member 600a and a vertical plate 600b.

More particular, the horizontal plate member 600a of the central member 600 includes a first lateral side 608, a second lateral side 610, a front side 612 and a rear side 614. The first lateral member 602 is secured to the horizontal plate member 600a of the central member 600 along the first lateral side 608 and the second lateral member 604 is secured to the horizontal plate member 600a of the central member 600 along the second lateral side 610. The first lateral member 602 is secured to the first lateral side 608 in a manner allowing one to selectively move the first lateral member 602 relative to the horizontal plate member 600a of the central member 600. This is achieved by providing the first lateral member 602 with forward and rearward tracks 616, 618 in which set screws 620, 622 extending to the horizontal plate member 600a of the central member 600 ride allowing for adjustment of the first lateral member 602 relative to the horizontal plate member 600a of the central member 600. When a desired orientation is achieved, the set screws 620, 622 are tightened securing the first lateral member 602 in position relative to the horizontal plate member 600a of the central member 600. Similarly, the second lateral member 604 is secured to the second lateral side 610 in a manner allowing one to selectively move the second lateral member 604 relative to the horizontal plate member 600a of the central member 600. This is achieved by providing the second lateral member 604 with forward and rearward tracks 624, 626 in which set screws 628, 630 extending to the horizontal plate member 600a of the central member 600 ride allowing for adjustment of the second lateral member 604 relative to the horizontal plate member 600a of the central member 600. When a desired orientation is achieved, the set screws 628, 630 are tightened securing the second lateral member 604 in position relative to the horizontal plate member 600a of the central member 600.

Adjustability of the first and second lateral members 602, 604, and ultimately the entire mounting plate 596, is achieved by providing each of the first and second lateral members 602, 604 with elongated openings 678, 680. The elongated openings 678, 680 allow for the passage of headrest support posts 521, which are differently spaced, to pass through the mounting plate 596 regardless of the orientation of the first and second lateral members 602, 604 relative the central member 600.

Where such a cradle orientation is employed, the base 664 of the video system 612 would similarly be adjusted to allow for mounting and viewing from the back seat of the automobile. In accordance with the embodiment disclosed herein, a fixed attachment is disclosed, although it is contemplated a selectively releasable construction may be used. More particularly, the mounting plate 596 is provided with screw holes 698 through which screws 700 are passed for engagement with threaded screw holes 698 along the mounting plate 596 of the cradle 538. In this way, the video system 512 is fixedly secured to the cradle 538 for utilization in conjunction with the present invention. This fixed attachment results in a system that complies with all automobile regulations relating to the utilization of headrests and the attachment of devices within an automobile passenger compartment.

In accordance with a further embodiment, and with reference to FIGS. 24, 25, 26 and 27, the cradle 738 is oriented such that it is positioned rearward of the headrest 714 so that the video system 712 may be mounted thereto without the need of a pivoting base. Where such an embodiment is employed, the video system 712 would be constructed with a base 764 statically fixed to the remainder of the housing 718 such that the base 764, and associated video housing, may be directly secured to the cradle 738 without pivoting or other adjustments relating to the orientation of the video monitor. Where such an embodiment is employed, the video system 712 and cradle 738 would be provided with electrical connections 742, 744 and fastening mechanisms 772, 790 as discussed above with regard to prior embodiments.

As briefly mentioned above with regard to the embodiment discussed above with reference to FIGS. 1 to 11, the present video system 112 is adapted for removal from the cradle 138 of an automobile 111 for use at a variety of other locations. In accordance with a preferred embodiment of the present invention, the other locations are provided with docking stations 150', 150", 150''' including auxiliary cradles 138', 138", 138''' shaped and dimensioned for receiving the video system 112 and coupling the video system 112 to power sources and a/v sources in a manner similar to the cradle 138 used in conjunction with the ceiling.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A vehicle entertainment system, comprising:
    a video system including a housing, a video monitor disposed on a front surface of the housing, a mounting portion disposed on a rear surface of the housing, and a first electrical connection disposed on the mounting portion; and
    a cradle disposed on a seat within a vehicle, wherein the cradle includes a first opening having a side configured to brace against a first support post of a headrest of the seat, a second opening having a side configured to brace against a second support post of the headrest, and a second electrical connection disposed within a third opening and configured to electrically connect to the first electrical connection,
    wherein the cradle rests against an upper end of the seat without being inserted into an internal portion of the seat,
    wherein the video system is configured to be detachably mounted to the cradle via the mounting portion being inserted into the third opening of the cradle, the video system is structurally supported by and electrically connected to the cradle upon inserting the mounting portion into the third opening, and the video system is spaced apart from the seat toward a rear of the vehicle upon mounting the video system to the cradle,
    wherein the third opening is spaced apart from the first and second openings in a direction toward the rear of the vehicle.

2. The vehicle entertainment system of claim 1, wherein a portion of the cradle that receives the mounting portion makes contact with an upper surface of the seat.

3. The vehicle entertainment system of claim 2, wherein the portion of the cradle that receives the mounting portion comprises a recess shaped and dimensioned to receive the mounting portion.

4. The vehicle entertainment system of claim 1, wherein a portion of the cradle that receives the mounting portion makes contact with a rear surface of the seat.

5. The vehicle entertainment system of claim 4, wherein the portion of the cradle that receives the mounting portion comprises a recess shaped and dimensioned to receive the mounting portion.

6. The vehicle entertainment system of claim 1, further comprising:
    a latch disposed on the mounting portion; and
    a latch member disposed on the cradle, wherein the latch member is shaped and dimensioned to receive the latch and the video system is detachably mounted to the cradle upon the latch being received into the latch member.

7. The vehicle entertainment system of claim 1, further comprising:
    a plurality of cradles disposed within the vehicle, wherein the cradle is one of the plurality of cradles, and the video system is configured to be selectively mounted to any one of the plurality of cradles via the mounting portion.

8. The vehicle entertainment system of claim 1, wherein the cradle is disposed between and aligned with the first support post of the headrest and the second support post of the headrest.

9. The vehicle entertainment system of claim 1, wherein the video system includes a video source.

10. The vehicle entertainment system of claim 1, further comprising:
    at least one cable extending through the seat and connecting to the cradle, wherein the at least one cable transmits power from the vehicle to the video system through the first and second electrical connections.

11. The vehicle entertainment system of claim 1, further comprising:
    a latch disposed on the mounting portion;
    a spring biased actuation mechanism disposed on the mounting portion and including a first finger lever and a second finger lever, wherein the spring biased actuation mechanism is configured to permit movement of the latch between an extended orientation and a retracted orientation in response to pushing the first and second finger levers toward one another and releasing the first and second finger levers; and
    a recess disposed on the rear surface of the housing shaped and dimensioned to receive the latch, wherein the latch is released from the recess in response to pushing the first and second finger levers toward one another,
    wherein the mounting portion is configured to pivot toward and away from the rear surface of the housing.

12. The vehicle entertainment system of claim 1, further comprising:
    a cover member configured to attach to the cradle and cover the second electrical connection while the video system is not mounted to the cradle.

13. The vehicle entertainment system of claim 1, wherein the first and second openings are disposed in a first plane, and the third opening is disposed in a second plane different from the third plane.

14. The vehicle entertainment system of claim 1, wherein the mounting portion of the video system is spaced apart from the first and second openings toward the rear of the vehicle upon being inserted into the third opening of the cradle.

15. The vehicle entertainment system of claim 1, wherein the third opening faces upward toward a ceiling of the vehicle.

16. A vehicle entertainment system, comprising:
    a video system including a housing, a video monitor disposed on a front surface of the housing, a mounting portion disposed on a rear surface of the housing, and a first electrical connection disposed on the mounting portion; and
    a cradle disposed on a seat within a vehicle, wherein the cradle includes a first opening having a side configured to brace against a first support post of a headrest of the seat, a second opening having a side configured to brace against a second support post of the headrest, and a second electrical connection disposed within a third opening and configured to electrically connect to the first electrical connection,
    wherein the video system is configured to be detachably mounted to the cradle via the mounting portion being inserted into the third opening of the cradle, the video system is structurally supported by and electrically connected to the cradle upon inserting the mounting portion into the third opening, and the video system is spaced apart from the seat toward a rear of the vehicle upon mounting the video system to the cradle,
    wherein the third opening faces upward toward a ceiling of the vehicle,
    wherein the third opening is spaced apart from the first and second openings in a direction toward the rear of the vehicle.

17. The vehicle entertainment system of claim 16, wherein the first and second openings are disposed in a first plane, and the third opening is disposed in a second plane different from the third plane.

* * * * *